(12) United States Patent
Zhu et al.

(10) Patent No.: US 11,253,911 B2
(45) Date of Patent: Feb. 22, 2022

(54) CURING AGENT FOR USE IN CASTING WATER GLASS

(71) Applicant: JINAN SHENGQUAN GROUP SHARE-HOLDING CO., LTD., Shandong (CN)

(72) Inventors: Jianxum Zhu, Shandong (CN); Huimin Yao, Shandong (CN)

(73) Assignee: JINAN SHENGQUAN GROUP SHARE-HOLDING CO., LTD., Shandong (CN)

( * ) Notice: Subject to any disclaimer, the term of this patent is extended or adjusted under 35 U.S.C. 154(b) by 373 days.

(21) Appl. No.: 16/483,413

(22) PCT Filed: Jan. 18, 2018

(86) PCT No.: PCT/CN2018/073201
§ 371 (c)(1),
(2) Date: Dec. 2, 2019

(87) PCT Pub. No.: WO2018/141211
PCT Pub. Date: Aug. 9, 2018

(65) Prior Publication Data
US 2020/0164426 A1 May 28, 2020

(30) Foreign Application Priority Data
Feb. 4, 2017 (CN) .......................... 201710064176.7

(51) Int. Cl.
*B22C 1/18* (2006.01)
*B22C 9/02* (2006.01)
*B22C 1/02* (2006.01)
*B22C 1/16* (2006.01)
*C01B 33/12* (2006.01)

(52) U.S. Cl.
CPC ................ *B22C 1/188* (2013.01); *B22C 1/02* (2013.01); *B22C 1/16* (2013.01); *B22C 1/167* (2013.01); *B22C 9/02* (2013.01); *C01B 33/12* (2013.01); *C01P 2002/02* (2013.01)

(58) Field of Classification Search
CPC .............. B22C 1/18; B22C 1/188; B22C 9/02
See application file for complete search history.

(56) References Cited

U.S. PATENT DOCUMENTS

| 2016/0167113 | A1 | 6/2016 | Lee et al. |
| 2016/0311724 | A1 | 10/2016 | Fourberg et al. |
| 2016/0361756 | A1* | 12/2016 | Deters ....................... B22C 1/00 |
| 2018/0318912 | A1* | 11/2018 | Trinowski ............... B22C 1/188 |
| 2019/0388960 | A1* | 12/2019 | Zhu ......................... B22C 1/188 |

FOREIGN PATENT DOCUMENTS

| CN | 101362190 A | 11/2009 |
| CN | 103212666 A | 7/2013 |
| CN | 104226890 A | 12/2014 |
| CN | 105665615 A | 6/2016 |

* cited by examiner

*Primary Examiner* — Kevin E Yoon
(74) *Attorney, Agent, or Firm* — Global IP Services; Tianhua Gu

(57) ABSTRACT

The present invention provides a curing agent for casting a water glass, including an ester and an amorphous silicon dioxide obtained by a thermal decomposition of $ZrSiO_4$; and the curing agent for casting the water glass does not contain water. According to the present invention, the curing agent for casting the water glass has a strong adhesion-enhancing effect and a long shelf life, and is easy to use.

11 Claims, No Drawings

CURING AGENT FOR USE IN CASTING WATER GLASS

CROSS REFERENCE TO RELATED PATENT APPLICATION

The present application is the US national stage of PCT/CN2018/073201 filed on Jan. 18, 2018, which claims the priority of the Chinese patent application No. 2017100641767 filed on Feb. 4, 2017, which applications are incorporated herein by reference.

TECHNICAL FIELD

The present invention relates to the technical field of modification of a curing agent for casting, and particularly to a curing agent for casting a water glass.

BACKGROUND

Casting is one of the most polluting industries in the machinery manufacturing industry, in which the adhesive for mold and core-making is the main source of pollution. Currently, organic adhesives such as furan resin and urethane resin are widely used in the foundry. When molten metal is poured into the sand mold, the organic adhesives may be burned and decomposed to release toxic gases and harmful substances such as toluene, xylene, phenol, carbon monoxide and suspended matter. In order to avoid emissions of decomposition products during the casting process, inorganic adhesives may be considered.

Typically, water glass is an inorganic adhesive synthesized by silica sand and soda ash. Water glass is one of the most resource-rich substances on the earth and is the casting resin with the least impact on the environment. However, under the same amount of addition, the mechanical properties of the water glass adhesive are lower than that of the organic resin, and the water glass has poor sand collapsibility, which hinders its promotion and application. Therefore, the specific strength of the water glass is improved by adding a water glass reinforcing agent (a curing agent for casting water glass).

Amorphous silicon dioxide can be used as the above-mentioned water glass reinforcing agent. For example, Chinese Patent having a publication No. CN101027147A discloses a mold-making material mixture for preparing sand molds for metal processing, including a refractory mold-making base material and a water glass-based adhesive, wherein a certain proportion of particulate amorphous silicon dioxide is added to the adhesive as a reinforcing agent. Although the mold-making material mixture can greatly improve the strength of the sand mold after molding, the particulate amorphous silicon dioxide as the reinforcing agent is a solid powder, which has poor continuity of addition and is inconvenient for metering and addition; the working environment deteriorated due to the dust flying during the feeding; and especially when used in ester hardened water glass sand, the additions of multiple components increase the complexity of the operation. Therefore, the amorphous silicon dioxide is disadvantageous for industrial applications.

On the other hand, compared with the amorphous silicon dioxide from other sources, amorphous silicon dioxide prepared by a thermal decomposition of $ZrSiO_4$ (amorphous silicon dioxide obtained by the thermal decomposition of $ZrSiO_4$) is preferred, because a mold core with higher weight can be obtained with the same amount of addition, which indicates that the sand mold particles are stacked more closely. In addition, in the preparation of a mixture, the amorphous silicon dioxide prepared by the thermal decomposition of $ZrSiO_4$ exhibits particularly excellent properties, and the mixture has lower viscosity and better fluidity, and is more convenient to be added and used.

However, if the above-mentioned amorphous silicon dioxide obtained by the thermal decomposition of $ZrSiO_4$ is stored in liquid for more than three months, when it is used as a curing agent of water glass, it will show a sharp reduction in the adhesive strength and even fail to play the role of self-hardening.

Therefore, if the above-mentioned amorphous silicon dioxide obtained by the thermal decomposition of $ZrSiO_4$ is prepared into a liquid form of water glass reinforcing agent, it is doubtful whether the water glass reinforcing agent can still exert a strong adhesion-enhancing effect.

SUMMARY

In view of the above-mentioned technical problems in the prior art, the objective of the present invention is to provide a curing agent for casting water glass with a strong adhesion-enhancing effect, a long shelf life and a convenient operation, and a method for producing the curing agent for casting water glass and an application thereof.

The present inventors have conducted in-depth research on solving the above-mentioned technical problems, and the results show that a water-free curing agent for casting water glass prepared by dispersing amorphous silicon dioxide obtained by a thermal decomposition of $ZrSiO_4$ in an ester can solve the above technical problems, thereby completing the present invention. That is, the present invention includes:

1. A curing agent for casting a water glass, including: an ester and an amorphous silicon dioxide obtained by a thermal decomposition of $ZrSiO_4$; wherein the curing agent for casting the water glass does not contain water.

2. The curing agent for casting the water glass according to item 1, further including an alcohol.

3. The curing agent for casting the water glass according to item 1 or 2, wherein, relative to total 100 parts by weight of the curing agent for casting the water glass, the curing agent includes:
   35-65 parts by weight of the ester,
   5-20 parts by weight of the alcohol, and
   20-45 parts by weight of the amorphous silicon dioxide obtained by the thermal decomposition of $ZrSiO_4$.

4. The curing agent for casting the water glass according to any one of items 1-3, wherein, a weight ratio of the ester to the amorphous silicon dioxide obtained by the thermal decomposition of $ZrSiO_4$ is (0.78-3.2):1, preferably (1.0-2.5):1.

5. The curing agent for casting the water glass according to any one of items 1-4, wherein, the ester is one or more selected from the group consisting of monoacetin, diacetin, triacetin, ethylene glycol diacetate, propylene carbonate, γ-butyrolactone, and a dibasic ester.

6. The curing agent for casting the water glass according to any one of items 2-5, wherein, the alcohol is one or more selected from the group consisting of ethanol, methanol, propanol, isopropanol, butanol, isobutanol, benzyl alcohol, ethylene glycol, and polyethylene glycol.

7. The curing agent for casting the water glass according to any one of items 1-6, which consists of the ester, the alcohol, and the amorphous silicon dioxide obtained by the thermal decomposition of $ZrSiO_4$.

8. A method for preparing the curing agent for casting the water glass of any one of items 1-7, which includes the following steps:

(1) first adding the ester weighed according to a weight ratio into a stirring tank of a high-speed mixing machine and stirring;

(2) adding the alcohol weighed according to the weight ratio as needed; and (3) keeping a stirring speed above 800 rpm, adding the amorphous silicon dioxide obtained by the thermal decomposition of $ZrSiO_4$ weighed according to the weight ratio, and continuously stirring for 10-20 minutes to obtain a suspension as the curing agent for casting the water glass.

9. An application of the curing agent for casting the water glass of any one of items 1-7 for producing a sand mold or a mold core, wherein, the sand mold or the mold core is used for a metal casting, and preferably, the metal casting is a steel casting.

10. A water glass self-hardening sand, wherein, relative to total 100 parts by weight of the water glass self-hardening sand, the water glass self-hardening sand includes:

95-98 parts by weight of a quartz sand, 1.8-3.6 parts by weight of a water glass, and 0.2-1.4 parts by weight of a curing agent for casting the water glass;

wherein, the curing agent for casting the water glass is the curing agent for casting water glass of any one of items 1-7.

ADVANTAGES OF THE PRESENT INVENTION

According to the present invention, the curing agent for casting the water glass with the strong adhesion-enhancing effect, the long shelf life and the convenient operation, and the method for producing the curing agent for casting the water glass and the application thereof, are provided.

DETAILED DESCRIPTION OF THE EMBODIMENTS

The present invention is described in detail hereinafter with reference to the specific embodiments. In the absence of conflict, the scientific terms in the present specification have the meanings commonly understood by those skilled in the art, and if there is a conflict, the definitions in the present specification shall prevail.

First, in one aspect, the present invention provides a curing agent for casting a water glass (curing agent of the present invention), which includes:

an ester, and an amorphous silicon dioxide obtained by a thermal decomposition of $ZrSiO_4$; wherein the curing agent for casting the water glass does not contain water.

In the present specification, the term "ester" refers to a product obtained by an esterification reaction between an alcohol and a carboxylic acid or an inorganic oxyacid, preferably a product obtained by an esterification reaction between an alcohol and an organic carboxylic acid. As the alcohol forming the ester, ethylene glycol or glycerin (glycerol) is preferred. As the carboxylic acid forming the ester, acetic acid or inorganic oxyacid (such as carbonic acid) is preferred. The ester contained in the curing agent of the present invention should be in a liquid state under normal conditions. Specific example of the ester includes, for example, one or more selected from the group consisting of monoacetin, diacetin, triacetin, ethylene glycol diacetate, propylene carbonate, γ-butyrolactone, and a dibasic ester.

Preferably, the curing agent of the present invention may further include an alcohol. The curing agent without alcohol is easy to be agglomerated during transportation, which requires a large speed to disperse, thus causing difficulties in the transfer and use of the curing agent. Through a large number of exploration experiments, the results showed that containing a certain amount of alcohol not only can make the curing agent of the present invention have an appropriate viscosity, but also can achieve the original effect after slightly stirring the coagulation generated after transportation or being placed for a long time, which is convenient to use.

In the present specification, the term "alcohol" refers to a compound formed by substituting a hydrogen atom on a side chain of an aliphatic hydrocarbon, an alicyclic hydrocarbon, or an aromatic hydrocarbon with a hydroxyl group. The alcohol contained in the curing agent of the present invention should be in a liquid state under normal conditions. Specific example of the alcohol includes, for example, one or more selected from the group consisting of ethanol, methanol, propanol, isopropanol, butanol, isobutanol, benzyl alcohol, ethylene glycol, and polyethylene glycol. The alcohol is less toxic, and the polarity of the alcohol can be between water and ester. A particularly preferred example is ethanol, because the suspension of the curing agent of the present invention can be more uniform and stable when the ethanol is used; and ethanol is also an optimum choice in terms of economy and environmental friendliness.

The amorphous silicon dioxide obtained by the thermal decomposition of $ZrSiO_4$ is in the form of particles, and the particulate amorphous silicon dioxide preferably has a particle size of less than 50 μm, more preferably less than 10 μm, particularly preferably less than 5 μm. The particle size can be determined by sieving analysis, and the sieve residue on the sieve having a mesh size of 10 μm is particularly preferably less than 7 wt %, preferably less than 4 wt %.

In the present specification, the term "water-free/does not contain water" means that at least no water is intentionally added to the curing agent of the present invention. Various components (such as the ester, the alcohol, the amorphous silicon dioxide obtained by the thermal decomposition of $ZrSiO_4$) constituting the curing agent of the present invention may contain a trace amount of water which is usually allowed. However, it is preferred to remove at least a part or all of the water before the curing agent of the present invention is produced. The present inventors have found that the presence of water greatly impairs the adhesion-enhancing effect of the curing agent of the present invention, resulting in a significant reduction of its adhesion-enhancing effect after a long-term storage. Accordingly, the water content of the curing agent of the present invention is preferably less than 3 wt %, more preferably less than 2 wt %, more preferably less than 1 wt %, more preferably less than 0.5 wt %, more preferably less than 0.2 wt %, more preferably less than 0.1 wt %, more preferably less than 0.05 wt %, more preferably less than 0.02 wt %, and more preferably less than 0.01 wt %.

In the present specification, the term "contain(s)" and "include(s)" means that it may include other components in addition to the components indicated. Examples of the other components include additives commonly used by those skilled in the art, such as a coupling agent (for example, a silane coupling agent or a carbonate coupling agent). In addition, in the present specification, as an embodiment, the term "contain(s)" or "include(s)" may be replaced with a closed expression "is/are" or "consist of/is composed of".

The present inventors have found that when the proportion of various components in the curing agent of the present invention is within a certain range, the technical effects of the present invention can be better achieved. Therefore, it is preferred that the curing agent of the present invention includes: 35-65 parts by weight of an ester, 5-20 parts by weight of an alcohol, and 20-45 parts by weight of the amorphous silicon dioxide obtained by the thermal decomposition of $ZrSiO_4$, relative to total 100 parts by weight of the curing agent of the present invention. In addition, a weight ratio of the ester to the amorphous silicon dioxide obtained by the thermal decomposition of $ZrSiO_4$ is preferably (0.78-3.2):1, more preferably (1.0-2.5):1. This enables the curing agent of the present invention to perform well in the aspects of adhesion-enhancing effect, shelf life and operation.

In another aspect, the present invention provides a method (manufacturing method of the present invention) for preparing the curing agent of the present invention, which includes the following steps:

(1) first adding the ester weighed according to a ratio into a stirring tank of a high-speed mixing machine and stirring;

(2) adding the alcohol weighed according to the ratio as needed; and (3) keeping a stirring speed above 800 rpm, adding the amorphous silicon dioxide obtained by the thermal decomposition of $ZrSiO_4$ weighed according to the ratio, and continuously stirring for 10-20 minutes to obtain a suspension as the curing agent for casting the water glass.

In the present specification, the term "according to the ratio" means according to the above-mentioned weight ratio in the curing agent of the present invention.

In the preparation method of the present invention, preferred examples of the ester and the alcohol are as described above.

The rotation speed in step (3) above is set to be above 800 rpm, and appropriate adjustment can be made, for example, within the range of 800 to 1000 rpm, preferably 900 to 1000 rpm.

In the case where the curing agent of the present invention further contains other components, the preparation method of the present invention may further include the steps of adding the other components. The other components may be added separately or together with the above ester or alcohol, or may be mixed with the above ester or alcohol for addition. Preferably, the ester is added first and then the other components are added.

The present inventors have found that by mixing the above components to prepare the curing agent of the present invention, the one-time addition of the curing agent for casting the water glass can be realized when it is applied to the preparation of the water glass self-hardening sand, without powder pollution, having simple operation, convenient metering and addition, which is advantageous for industrial production. Moreover, even if the curing agent of the present invention is stored for more than 90 days before use, the adhesion-enhancing effect will not be weakened, the strength of the water glass sand can still be significantly enhanced, and after molding, the manufactured sand mold or mold core can still maintain relatively high strength after being stored for a long time, which greatly improves the mechanical properties of the sand mold or mold core.

Although the mechanism of action of the present invention is not clear, one explanation is that in the presence of water in the system, the amorphous silicon dioxide obtained by the thermal decomposition of $ZrSiO_4$ interacts with the water to accelerate the decomposition of the ester, and by excluding water from the system, the decomposition of the ester is suppressed.

Accordingly, in another aspect, the present invention provides an application of the curing agent of the present invention for producing a sand mold or a mold core. The sand mold or mold core is preferably used for a metal casting, and preferably, the metal casting is a steel casting.

Moreover, in another aspect, the present invention also provides a water glass self-hardening sand. Moreover, relative to total 100 parts by weight of the water glass self-hardening sand, the water glass self-hardening sand includes: 95-98 parts by weight of a quartz sand, 1.8-3.6 parts by weight of a water glass, and 0.2-1.4 parts by weight of a curing agent for casting water glass; and the curing agent for casting water glass is the curing agent of the present invention.

EMBODIMENTS

The present invention will be more specifically described below in combination with the embodiments. The following embodiments are given to facilitate the understanding of the present invention, rather than limit the present invention.

Embodiment 1

| Ratio of components | (Mass/g) |
|---|---|
| Monoacetin | 12 |
| Ethylene glycol diacetate | 3 |
| Triacetin | 45 |
| Amorphous silicon dioxide obtained by the thermal decomposition of $ZrSiO_4$ | 40 |

The morphous silicon dioxide obtained by the thermal decomposition of $ZrSiO_4$ was purchased from Bengbu Zhongheng New Materials Scientific and Technological Co., Ltd., with a particle size of 0.5 μm (D50), similarly hereinafter.

Embodiment 2

| Ratio of components | (Mass/g) |
|---|---|
| Monoacetin | 10 |
| Ethylene glycol diacetate | 9 |
| Triacetin | 51 |
| Amorphous silicon dioxide obtained by the thermal decomposition of $ZrSiO_4$ | 30 |

Embodiment 3

| Ratio of components | (Mass/g) |
|---|---|
| Monoacetin | 2 |
| Ethylene glycol diacetate | 27 |
| Triacetin | 51 |
| Amorphous silicon dioxide obtained by the thermal decomposition of $ZrSiO_4$ | 20 |

Embodiment 4

| Ratio of components | (Mass/g) |
| --- | --- |
| Monoacetin | 10 |
| Ethylene glycol diacetate | 2 |
| Triacetin | 28 |
| Amorphous silicon dioxide obtained by the thermal decomposition of $ZrSiO_4$ | 40 |
| Ethanol | 20 |

Embodiment 5

| Ratio of components | (Mass/g) |
| --- | --- |
| Monoacetin | 2 |
| Ethylene glycol diacetate | 24 |
| Triacetin | 44 |
| Amorphous silicon dioxide obtained by the thermal decomposition of $ZrSiO_4$ | 20 |
| Ethanol | 10 |

Embodiment 6

| Ratio of components | (Mass/g) |
| --- | --- |
| Monoacetin | 10.8 |
| Ethylene glycol diacetate | 2.4 |
| Triacetin | 46.8 |
| Amorphous silicon dioxide obtained by the thermal decomposition of $ZrSiO_4$ | 30 |
| Ethanol | 10 |

Embodiment 7

| Ratio of components | (Mass/g) |
| --- | --- |
| Monoacetin | 10.8 |
| Ethylene glycol diacetate | 2.4 |
| Triacetin | 46.8 |
| Amorphous silicon dioxide obtained by the thermal decomposition of $ZrSiO_4$ | 30 |
| Ethanol | 10 |
| Silane coupling agent KH-560 | 1.0 |

Embodiment 8

| Ratio of components | (Mass/g) |
| --- | --- |
| Monoacetin | 9.1 |
| Ethylene glycol diacetate | 1.8 |
| Triacetin | 25.5 |
| Amorphous silicon dioxide obtained by the thermal decomposition of $ZrSiO_4$ | 36.4 |
| n-propanol | 27.2 |

In each of the above embodiments, the ester is first added to the reaction tank and the stirring is started; then the alcohol and other components are added; the stirring speed is adjusted at 900-1100 rpm; the amorphous silicon dioxide is added and the stirring is continued for 20 min to obtain the curing agent for casting water glass in each embodiment of the present invention.

Comparative Example 1

| Ratio of components | (Mass/g) |
| --- | --- |
| Monoacetin | 10 |
| Ethylene glycol diacetate | 2 |
| Triacetin | 28 |
| Amorphous silicon dioxide obtained by the thermal decomposition of $ZrSiO_4$ | 40 |
| Ethanol | 10 |
| Water | 10 |

Comparative Example 2

| Ratio of components | (Mass/g) |
| --- | --- |
| Monoacetin | 10 |
| Ethylene glycol diacetate | 2 |
| Triacetin | 28 |
| Amorphous silicon dioxide obtained by the thermal decomposition of $ZrSiO_4$ | 40 |
| Ethanol | 15 |
| Water | 5 |

Comparative Example 3

| Ratio of components | (Mass/g) |
| --- | --- |
| Monoacetin | 7.2 |
| Ethylene glycol diacetate | 1.6 |
| Triacetin | 31.2 |
| Amorphous silicon dioxide obtained by the thermal decomposition of $ZrSiO_4$ | 30 |
| Ethanol | 10 |
| Water | 20 |

The preparation method of the curing agent for casting water glass of each comparative example was the same as that of the curing agent for casting water glass of each embodiment.

The curing agents for casting water glass prepared in the above embodiments and comparative examples were used for the preparation of water glass self-hardening sand. The specific operation is as follows: each curing agent for casting water glass was stored in a drying oven at 55° C. for performing accelerated storage test, and after 18 days of storage (equivalent to 6 months of storage at room temperature), the strength of the each curing agent for casting water glass was compared with that of the newly prepared sample. 1000 g of Dalin standard sand was weighed and added to a laboratory vane sand mixer, 5.31 g of the each above-mentioned curing agent for casting water glass was added respectively, stirring was performed for 1 min, 20 g of water glass (modulus of 2.3, solid content of 40%) was added, stirring was performed for 1 min, followed by producing sand, then the sand was hammered into an "8" shaped test block, and the tensile strengths at 1 h, 4 h and 24 h were tested and the standard GB-2684 was implemented, the results are shown in Table 1 and Table 2. The "8" shaped test block was stored in a constant temperature and humidity chamber at 20° C. and 40% (RH %).

TABLE 1

| Number | Tensile strength (MPa) | | |
|---|---|---|---|
| | 1 h | 4 h | 24 h |
| Embodiment 1 (newly prepared) | 0.278 | 0.510 | 0.578 |
| Embodiment 1 (dried at 55° C. for 18 days) | 0.282 | 0.517 | 0.582 |
| Embodiment 2 (newly prepared) | 0.241 | 0.530 | 0.612 |
| Embodiment 2 (dried at 55° C. for 18 days) | 0.239 | 0.524 | 0.608 |
| Embodiment 3 (newly prepared) | 0.146 | 0.358 | 0.621 |
| Embodiment 3 (dried at 55° C. for 18 days) | 0.142 | 0.361 | 0.624 |
| Embodiment 4 (newly prepared) | 0.231 | 0.532 | 0.645 |
| Embodiment 4 (dried at 55° C. for 18 days) | 0.225 | 0.515 | 0.651 |
| Embodiment 5 (newly prepared) | 0.135 | 0.352 | 0.608 |
| Embodiment 5 (dried at 55° C. for 18 days) | 0.139 | 0.347 | 0.612 |
| Embodiment 6 (newly prepared) | 0.244 | 0.488 | 0.587 |
| Embodiment 6 (dried at 55° C. for 18 days) | 0.230 | 0.493 | 0.579 |
| Embodiment 7 | 0.254 | 0.546 | 0.654 |
| Embodiment 7 (dried at 55° C. for 18 days) | 0.258 | 0.551 | 0.650 |
| Embodiment 8 | 0.187 | 0.421 | 0.556 |
| Embodiment 8 (dried at 55° C. for 18 days) | 0.182 | 0.429 | 0.551 |

TABLE 2

| Number | Tensile strength (MPa) | | |
|---|---|---|---|
| | 1 h | 4 h | 24 h |
| Comparative example 1 (newly prepared) | 0.210 | 0.488 | 0.602 |
| Comparative example 1 (dried at 55° C. for 18 days) | 0.132 | 0.214 | 0.228 |
| Comparative example 2 (newly prepared) | 0.217 | 0.508 | 0.622 |
| Comparative example 2 (dried at 55° C. for 18 days) | 0.162 | 0.224 | 0.238 |
| Comparative example 3 (newly prepared) | 0.117 | 0.298 | 0.518 |
| Comparative example 3 (dried at 55° C. for 18 days) | 0.096 | 0.119 | 0.120 |

As shown in embodiments in Table 1, the samples dried in a drying oven at 55° C. for 18 days showed only minor changes in strength compared to the newly prepared samples and did not affect the actual use. However, as shown in Table 2, the curing agents for casting water glass of comparative examples dried in a drying oven at 55° C. for 18 days have obviously reduced adhesion-enhancing effect and could not be used. It can be seen that the curing agent for casting water glass of the present invention does not decline in adhesion-enhancing effect after a long-term storage.

What is claimed is:

1. A curing agent for a water glass, comprising: an ester and an amorphous silicon dioxide obtained by a thermal decomposition of $ZrSiO_4$; wherein the curing agent for the water glass contains less than 1 wt. % water, wherein, 100 parts of the curing agent for the water glass by weight comprises: 35-65 parts of the ester by weight, 5-20 parts of the alcohol by weight, and 20-45 parts of the amorphous silicon dioxide obtained by the thermal decomposition of $ZrSiO_4$ by weight.

2. The curing agent for casting the water glass according to claim 1, further comprising an alcohol.

3. The curing agent for the water glass according to claim 2, wherein, the alcohol is one or more selected from the group consisting of ethanol, methanol, propanol, isopropanol, butanol, isobutanol, benzyl alcohol, ethylene glycol, and polyethylene glycol.

4. The curing agent for the water glass according to claim 2, consisting of the ester, the alcohol, and the amorphous silicon dioxide obtained by the thermal decomposition of $ZrSiO_4$.

5. The curing agent for the water glass according to claim 2, wherein, 100 parts of the curing agent for the water glass by weight comprises:
   35-65 parts of the ester by weight,
   5-20 parts of the alcohol by weight, and
   20-45 parts of the amorphous silicon dioxide obtained by the thermal decomposition of $ZrSiO_4$ by weight.

6. The curing agent for the water glass according to claim 2, wherein, a weight ratio of the ester to the amorphous silicon dioxide obtained by the thermal decomposition of $ZrSiO_4$ is (0.78-3.2):1, preferably (1.0-2.5):1.

7. The curing agent for the water glass according to claim 2, wherein, the ester is one or more selected from the group consisting of monoacetin, diacetin, triacetin, ethylene glycol diacetate, propylene carbonate, γ-butyrolactone, and a dibasic ester.

8. The curing agent for the water glass according to claim 1, wherein, a weight ratio of the ester to the amorphous silicon dioxide obtained by the thermal decomposition of $ZrSiO_4$ is (0.78-3.2):1, preferably (1.0-2.5):1.

9. The curing agent for the water glass according to claim 1, wherein, the ester is one or more selected from the group consisting of monoacetin, diacetin, triacetin, ethylene glycol diacetate, propylene carbonate, γ-butyrolactone, and a dibasic ester.

10. A method for preparing the curing agent for the water glass of claim 1, comprising the following steps:
   (1) first adding the ester weighed according to a weight ratio into a stirring tank of a high-speed mixing machine and stirring;
   (2) adding the alcohol weighed according to the weight ratio as needed; and
   (3) keeping a stirring speed above 800 rpm, adding the amorphous silicon dioxide obtained by the thermal decomposition of $ZrSiO_4$ weighed according to the weight ratio, and continuously stirring for 10-20 minutes to obtain a suspension as the curing agent for the water glass.

11. A water glass self-hardening sand, wherein, 100 parts of the water glass self-hardening sand by weight comprises:
   95-98 parts of a quartz sand by weight,
   1.8-3.6 parts of a water glass by weight, and
   0.2-1.4 parts of a curing agent for the water glass by weight;
   wherein, the curing agent for the water glass is the curing agent for cast water glass of claim 1.

* * * * *